Feb. 26, 1963
F. L. ROSNER
3,079,028
PACKAGE FOR GROUND MEAT
Filed July 26, 1960
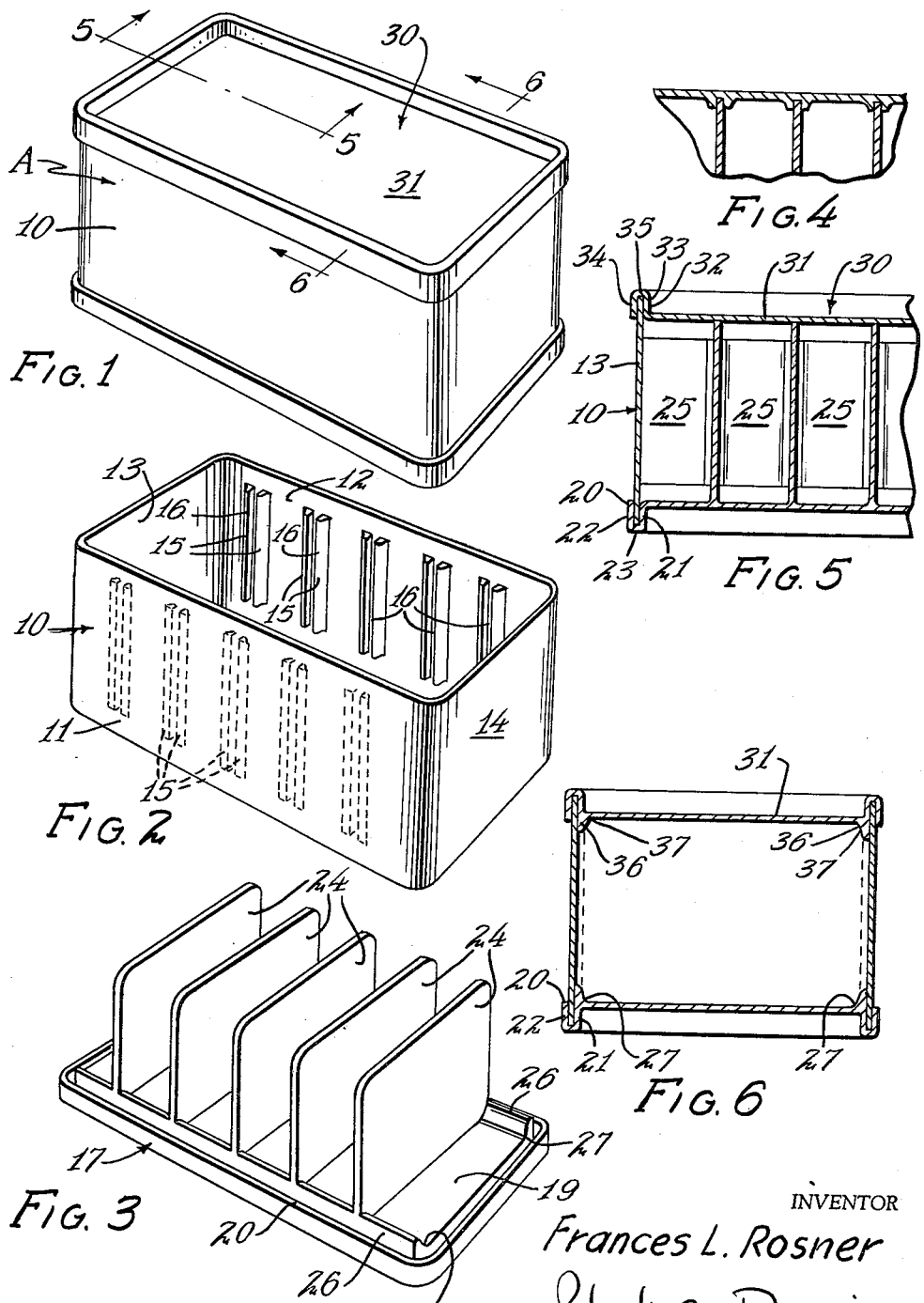
INVENTOR
Frances L. Rosner
BY Robert M. Dunning
ATTORNEY

United States Patent Office 3,079,028
Patented Feb. 26, 1963

3,079,028
PACKAGE FOR GROUND MEAT
Frances L. Rosner, 1344 Midway Parkway,
St. Paul 13, Minn.
Filed July 26, 1960, Ser. No. 45,480
7 Claims. (Cl. 220—22)

This invention relates to an improvement in package for ground meat and the like and deals particularly with a container for use in storing ground beef and the like.

Ground beef and similar meats used in making sandwiches is usually sold in bulk by the pound. When a quantity of such a product is purchased which is in excess of that to be used immediately, a portion of the meat is often cooked and the remainder of the meat is placed in the freeer. After the meat has been frozen, it must be thawed before any more of the meat can be used. If, after thawing, all of the meat is not used, the remainder must be refrozen. The refreezing of such a product after it has been thawed is not at all desirable and such a procedure is not normally recommended.

An object of the present invention resides in the provision of a special container preferably made of plastic or similar material including an outer wall or sleeve and end closures for the ends of the sleeve. One of these end closures is provided with spaced parallel partitions which extend throughout the length of the sleeve to the opposite closure. The receptacle is preferably of proper size to contain a predetermined quantity of product to be frozen. For example, the container may be made to contain one or two pounds of ground meat. The meat is inserted into the container while the partitions are in position therein. In other words, the meat is merely forced into the container so as to fill or partially fill the same between the spaced partitions. The opposite end closure is applied to the sleeve and the package may be inserted into the refrigerator or freezer and may be frozen. When it is desired to use a portion of the meat, the package is removed from the freezer, and the sleeve may be removed. By slightly warming the end closure bearing the partition, the meat contained between any pair of spaced partitions or between the end partitions of the series and the end of the package may be easily removed without thawing the meat. The remaining portion of the meat may then be returned to the package and returned to the freezer, thus eliminating the necessity for thawing and refreezing the meat.

A further feature of the present invention resides in the provision of a container which divides a quantity of a product such as ground meat or the like into a series of generally rectangular blocks of meat which may be of proper size to make sandwiches or the like. For example, the container may be divided into six areas or chambers each containing an equal amount of meat, and the meat contained in each compartment is of proper size to form a sandwich. One or two of the blocks of meat may be removed at a time, and the remaining meat may be retained in the container while still in a frozen condition.

A further feature of the present invention resides in the provision of a container which may be used to divide a quantity of a product such as ground beef into blocks of similar size. It is usual practice for the purchaser of a product such as ground meat to either remove portions of the meat with the hand or through the use of a suitable utensil and to form the meat into patties for cooking. Due to the fact that this operation is accomplished entirely by guess, the size of the patties varies considerably. However, by placing the meat into the container to fill the chambers between the partitions, blocks of meat of uniform size are formed. As the sleeve forming the side walls of the container is removable from the base which includes the partitions, the various blocks may be readily removed after the upper closure and sleeve have been removed.

A further feature of the present invention resides in the provision of a sleeve which is usually rectangular in form and which usually includes opposed grooves designed to accommodate the partition wall of one of the end closures. These grooves guide the partitions during insertion, and hold them in parallel relation in the sleeve. When the sleeve is on the bottom closure, the sleeve may be filled with the product and may be enclosed by the top closure plate.

These and other objects and novel features of the present invention will be more clearly and fully set forth in the following specification and claims.

In the drawings forming a part of the specification:

FIGURE 1 is a perspective view of the container showing the general construction thereof.

FIGURE 2 is a perspective view of the sleeve or body portion of the container.

FIGURE 3 is a perspective view of the bottom closure of the container.

FIGURE 4 is a horizontal section through a portion of the closed container.

FIGURE 5 is a sectional view on the line 5—5 of FIGURE 1.

FIGURE 6 is a sectional view on the line 6—6 of FIGURE 1.

The package in its completed form is shown in FIGURE 1 of the drawings. In this form, the package is filled with a product such as ground meat, and is usually prepared for freezing. When thus contained, the product is divided into blocks of material of similar size which can be readily removed from the package without thawing the entire contents.

The package includes three main parts. The wall portion 10 comprises merely a rectangular sleeve of plastic or similar material capable of withstanding low temperatures without becoming brittle. As best indicated in FIGURE 2 of the drawings, a body portion 10 is elongated in form and includes spaced parallel side walls 11 and 12 which are connected by spaced parallel end walls 13 and 14.

In preferred form, the side walls 11 and 12 are provided with spaced vertical ribs 15 which are arranged in pairs to provide guide grooves 16 therebetween. The ribs 15 are arranged in equally spaced relation upon the inner surfaces of the walls 11 and 12. The purpose of this arrangement will be later described.

The second major portion of the package comprises a bottom closure which is indicated in general by the numeral 17. The bottom closure 17 includes a closure panel 19 of proper size to fit snugly within the side and end walls of the sleeve 10. A channel shaped peripheral edge 20 encircles the rectangular closure panel 19 and, as is indicated in FIGURES 5 and 6 of the drawings, includes an inner flange 21, an outer flange 22, and a connecting base 23. The flanges 21 and 22 are spaced apart sufficiently to frictionally accommodate the lower edge of the sleeve 10. As a result, the sleeve and bottom closure may be frictionally engaged when the two parts are telescoped together. At least the bottom closure is preferably formed of a somewhat pliable plastic which is somewhat resilient in nature and which is capable of flexing to some extent.

A series of spaced parallel partitions 24 extend upwardly from the closure panel 19 in evenly spaced relation. The end partitions of the series are spaced from the end wall 13 and 14 of the body 10 a distance substantially equal to the distance between partitions. As a result, the partitions 24 divide the interior of the sleeve 10 into a series of compartments 25 of equal volume. In the particular arrangement illustrated, the partition panels 24 are five in number and thus divide the interior of the sleeve 10 into six similar chambers 25.

Flanges 26 having curved or rounded inner surfaces 27 extend upwardly from the bottom panel 19 substantially in alignment with the inner flanges 21 of the channel shaped edge 20, the inner surfaces 27 forming fillets at the bottom corners of the compartments so as to provide rounded corners on the blocks of product within the package. The grooves 16 between the spaced ridges or ribs 15 provide guide grooves for the edges of the partitions 24 and hold these partitions in parallel relation as the sleeve 10 is telescoped over the partition panels 24.

The top closure 30 is substantially identical to the bottom closures with the partition panel 24 eliminated. The top closure 30 includes a top closure panel 31 which is of proper dimensions to fit within the upper end of the sleeve 10. A peripheral channel shaped edge 32 encircles the panel 31 and includes an inner flange 33, an outer flange 34, and a connecting base or web 35. The flanges 33 and 34 are spaced apart a distance sufficient to accommodate the upper edge of the sleeve 10 so as to permit the top closure to frictionally engage the upper edges of the wall. When in place, the top closure 30 forms a substantially air tight enclosure for the product. Downwardly extending flanges 36 having rounded inner surfaces 37 are provided along opposite sides of the under surface of the closure plate 31, the rounded inner surfaces forming rounded fillets for rounding the upper edges of the blocks of meat or other material contained.

In operation, the sleeve 10 is telescoped down over bottom closure 17, the vertical edges of the partitions 24 fitting in the guide grooves 16. The ground meat or other such product is then forced downwardly into the top of the package between the various partitions within the walls of the sleeve. The product is preferably forced downwardly to extend flush with the upper edges of the partitions 24. This divides the product into blocks of uniform size and, if desired, the device may be used for this purpose. However, the utility of the construction can be increased if the package is used as a freezer package.

When the product is frozen, and it is desired to remove a part of the contents, the container is removed from the freezer, and the sleeve and upper closure may be removed from the bottom closure. With many products, the product does not stick to the sleeve or top closure sufficiently to cause any difficulty to be experienced in opening the package. If any sticking occurs, the package may be permitted to warm slightly, at which time it may be readily opened. Warming the package slightly does not act to thaw the product to any appreciable extent.

After the desired amount of the product has been removed from the package, the sleeve and upper closure may be reinserted in place and the package may be returned to the freezer. Due to the fact that the product is not thawed appreciably, it is not injured by being returned to the freezing compartment.

The sections of product in each of the chambers may be readily removed due to the fact that there is no great tendency for the product to adhere to the partitions and due to the fact that the partitions and bottom closure are sufficiently resilient to permit the partitions to be flexed slightly after they have been removed from their guiding grooves which hold them parallel. Furthermore, if necessary, warm water which may be used to slightly heat the outer container before it is opened may simplify the removal of the product if sticking occurs. If necessary, a knife or spatula may be inserted between the product and the partitions, the partitions flexing somewhat to permit this operation. Under normal circumstances, such a procedure is not necessary.

In accordance with the patent statutes, I have described the principles of construction and operation of my improvement in package for ground meat, and while I have endeavored to set forth the best embodiment thereof, I desire to have it understood that changes may be made within the scope of the following claims without departing from the spirit of my invention.

I claim:

1. A package for food and the like including an open ended sleeve, a pair of closures frictionally engageable with said sleeve for closing the ends of said sleeve, one of said closures including spaced partitions fixed thereto designed to divide the space between said closures into a series of compartments, the dimensions of said partitions being substantially coextensive to the cross sectional dimensions of said sleeve.

2. The construction described in claim 1 and including means on said sleeve engageable with said partitions to hold them in parallel relation.

3. The construction described in claim 1 and in which the inner surface of said sleeve includes a series of spaced guide grooves for slidably supporting the edges of said partitions.

4. The construction described in claim 1 and in which said one closure is formed of slightly flexible resilient material.

5. A container including a sleeve of generally rectangular section having open ends, a closure for closing one of said ends, said closure being frictionally engageable with said one end, and said closure including a series of parallel spaced partitions of uniform dimensions extending substantially toward the other end of said sleeve and acting to divide the container into compartments, said partitions being fixedly carried by said closure.

6. The structure of claim 5 and including guide means on two opposed walls of said sleeve slidably engageable with the edges of said partitions.

7. A container including a generally rectangular sleeve, a bottom closure frictionally engageable with the lower end of said sleeve, a series of partition panels extending upwardly from said bottom closure, the side edges of said partitions engaging two opposed walls of said sleeve and the partitions being substantially parallel to the remaining walls of the sleeve and of sufficient height to extend substantially to the top of said sleeve.

References Cited in the file of this patent
UNITED STATES PATENTS

| | | |
|---|---|---|
| 571,171 | Prange | Nov. 10, 1896 |
| 1,015,892 | Jefferson | Jan. 30, 1912 |
| 2,242,059 | De Witt | May 13, 1941 |
| 2,713,347 | Hazy | July 19, 1955 |